ns in as asre in the ex

UNITED STATES PATENT OFFICE.

FRANZ CARL WEISS, OF OTTAKRING, NEAR VIENNA, ASSIGNOR OF ONE-HALF TO KONRAD EDWARD KLIMOSCH, OF VIENNA, AUSTRIA-HUNGARY.

DYE.

SPECIFICATION forming part of Letters Patent No. 443,026, dated December 16, 1890.

Application filed March 18, 1890. Serial No. 344,398. (No specimens.)

*To all whom it may concern:*

Be it known that I, FRANZ CARL WEISS, of the town of Ottakring, near Vienna, in the Austrian Empire, have invented certain new and useful Improvements in Dyes, of which the following is a specification.

My invention relates to improvements in dyes.

The employment of an extract composed chiefly of an extract from the fruit of the *Anacardium orientalis* or *Anacardium occidentalis*, or their varieties, for dyeing purposes, under the name of "anacardin extract," forms the object of this invention. The fruit of this tree contains, especially between the core and the shell, an acrid, somewhat viscid juice or kind of oil, which is at first of milky hue, but later on changes to a brown-black color, and which becomes in time hard, and can be readily extracted in the viscous as well as the hard condition. The extraction can be carried out in various ways, the simplest being the extraction by means of spirits of wine, which is best effected by treating the small cut fruit in the customary manner of extracting with spirits of wine in a double-walled vessel and heating the same. According to the duration of the operation (from one to five hours) and according to the strength of the spirit employed, a more or less concentrated extract is obtained, which is clarified by filtering or decanting, and which can be diluted, as may be desired.

This anacardin extract forms a dye which possesses the valuable property of not injuring the fiber in any manner, and which intimately, immediately, and without any difficulty unites with the fibers of linen, cotton, wool, silk, felt, cloth, and the like in loose or woven condition, even in the cold, and when mixed with alkalies or milk of lime will immediately change its color, so that a gray dye in various shades is produced which will not only withstand the influence of air, light, and washing, but also the action of hydrochloric and sulphuric acid baths. The most extensive variations in gray can be attained from the lightest to the darkest shades, according as the anacardin extract is used in cold or warm condition or the degree of dilution, the duration of the action, the use of the dissolved alkalies in more or less diluted condition, and cold, warm, or hot, and even these tones or shades can be modified and other colors obtained by means of diluted nitric acid. These dyes alone or in combination with other dyes are more durable the hotter the alkalies are employed.

It would lead me too far if I were to attempt to describe all the various tones and shades of color which can be obtained from anacardin extract, and will therefore only mention besides the above described the following as specimens:

When heavy anacardin ground dyes are treated with soda lye, black colors are obtained, while if the diluted anacardin extract is treated with nitric acid yellow colors are achieved, and will be lighter or darker according to the concentration of the anacardin extract and the nitric acid.

In consequence of the durable properties of the present dyes their employment is specially recommended as ground dye for indigo dyeing in order to spare this expensive dye as far as possible. The employment of the anacardin extract, which in this case is treated with bichromate of potassium, is as follows: The materials to be dyed require no preparation, but are steeped (taking the aforesaid into account) for about half a minute in the diluted anacardin extract and then pressed out as hard as possible, so that they hardly feel damp. The materials are now placed in a hot (not too strong) bath of bichromate of potassium and allowed to remain from two to five minutes in the same, and then immediately washed in cold water, it being recommended that the washed and dyed material be allowed to remain a short time in the water. The preparation of the ground ready for indigo dyeing is now finished, and the materials are subjected in the customary manner to the indigo-dyeing process while in their damp condition. The ground color or dye can be from light to dark gray; but the darker the ground color the less indigo will be required, and the better the steeping or the indigo-bath is the quicker will the dyeing be finished, as will be evident to all practical dyers. As already mentioned, in general these ground colors for indigo are perfectly air and wash proof and will not be affected by light, and are durable even in hydrochloric-acid and sulphuric-acid baths, as is the case with indigo, while they also possess the same properties as indigo, and that the color can be changed by applying nitric acid. As the ground colors are lighter or darker, the yellow tints will accordingly be lighter or darker.

In conclusion I may remark that the materials which have been dyed with indigo and dried can be steamed or otherwise treated.

I claim—

1. The herein-described process of dyeing, consisting in treating the materials to be dyed with anacardin extract, bichromate of potassium, water, and indigo, substantially as described.

2. The herein-described process of dyeing, consisting in steeping the material to be dyed in diluted anacardin extract, then pressing said material as hard as possible, then treating the same to a hot bath of bichromate of potassium, and then washing the same in cold water, as set forth.

3. The herein-described process of dyeing, consisting in steeping the material to be dyed in dilute anacardin extract, then pressing said material as hard as possible, then treating the same to a hot bath of bichromate of potassium, then washing the same in cold water, and then subjecting said material to the ordinary indigo-dyeing process, substantially as set forth.

In witness whereof I hereunto set my hand in presence of two witnesses.

FRANZ CARL WEISS.

Witnesses:
RUDOLFORUS CLARK,
NETTIE S. HARRIS.